US010263499B2

(12) United States Patent
Yamashita

(10) Patent No.: US 10,263,499 B2
(45) Date of Patent: Apr. 16, 2019

(54) MOTOR

(71) Applicant: Nidec Corporation, Kyoto (JP)

(72) Inventor: Yoshiaki Yamashita, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 201 days.

(21) Appl. No.: 15/528,169

(22) PCT Filed: Oct. 17, 2015

(86) PCT No.: PCT/JP2015/079385
§ 371 (c)(1),
(2) Date: May 19, 2017

(87) PCT Pub. No.: WO2016/080127
PCT Pub. Date: May 26, 2016

(65) Prior Publication Data
US 2017/0324300 A1 Nov. 9, 2017

(30) Foreign Application Priority Data
Nov. 20, 2014 (JP) .................................. 2014-235760

(51) Int. Cl.
*H02K 11/30* (2016.01)
*H02K 11/33* (2016.01)
(Continued)

(52) U.S. Cl.
CPC ............... *H02K 11/30* (2016.01); *H02K 5/22* (2013.01); *H02K 5/24* (2013.01); *H02K 11/21* (2016.01); *H02K 11/215* (2016.01); *H02K 11/33* (2016.01)

(58) Field of Classification Search
CPC ........ H02K 5/24; H02K 11/215; H02K 11/33; H02K 5/22; H02K 11/21; H02K 11/30
See application file for complete search history.

(56) References Cited

U.S. PATENT DOCUMENTS 6,271,638 B1 * 8/2001 Erdman .................. F25D 29/00
318/400.01
9,099,901 B2   8/2015 Fujimoto
(Continued)

FOREIGN PATENT DOCUMENTS

JP      2004-023841 A    1/2004
JP      2004-129362 A    4/2004
(Continued)

OTHER PUBLICATIONS

Official Communication issued in International Patent Application No. PCT/JP2015/079385, dated Dec. 22, 2015.

Primary Examiner — Mohamad A Musleh
(74) Attorney, Agent, or Firm — Keating & Bennett, LLP

(57) ABSTRACT

A motor includes: a motor main body; a power board including a switching element and electrically connected to the motor main body; a control board electrically connected to the power board and disposed on an axial counter output side of the motor main body; a control board holder attached to the motor main body to hold the control board; a sensor magnet located on a counter output side of a stator and fixed to a shaft; a rotation sensor attached to the control board to face the sensor magnet; and a power board case directly or indirectly attached to the motor main body to hold the power board. The power board is positioned radially outward of the motor main body. Board surfaces of the power board are inclined with respect to board surfaces of the control board.

21 Claims, 5 Drawing Sheets

(51) Int. Cl.
  *H02K 11/21* (2016.01)
  *H02K 5/22* (2006.01)
  *H02K 5/24* (2006.01)
  *H02K 11/215* (2016.01)

(56) References Cited

U.S. PATENT DOCUMENTS

| | | |
|---|---|---|
| 2003/0230942 A1 | 12/2003 | Okubo et al. |
| 2007/0246289 A1 | 10/2007 | Tominaga |
| 2009/0079280 A1 | 3/2009 | Terauchi et al. |
| 2011/0254388 A1 | 10/2011 | Yamasaki |
| 2012/0223624 A1 | 9/2012 | Yamashita et al. |
| 2012/0286602 A1* | 11/2012 | Uchida ............... H02K 11/33 310/71 |
| 2012/0286604 A1 | 11/2012 | Abe et al. |
| 2012/0307476 A1 | 12/2012 | Masuzawa et al. |
| 2013/0099609 A1 | 4/2013 | Ikeno et al. |

FOREIGN PATENT DOCUMENTS

| | | |
|---|---|---|
| JP | 2008-100618 A | 5/2008 |
| JP | 2011-229228 A | 11/2011 |
| JP | 2012-186913 A | 9/2012 |
| JP | 2012-239294 A | 12/2012 |
| JP | 2013-090532 A | 5/2013 |
| JP | 2014-151850 A | 8/2014 |
| WO | 2006/109714 A1 | 10/2006 |

\* cited by examiner

MOTOR

CROSS REFERENCE TO RELATED APPLICATIONS

This application claims the benefit of priority to Japanese Patent Application No. 2014-235760 filed on Nov. 20, 2014 and PCT Application No. PCT/JP2015/079385 filed on Oct. 17, 2015. The entire contents of each application are hereby incorporated herein by reference.

BACKGROUND OF THE INVENTION

1. Field of the Invention

The present invention relates to a motor.

2. Description of the Related Art

For example, Japanese Patent Application Publication No. 2011-229228 describes an electromotive device provided with a controller on one side of a shaft of an electric motor. The controller includes a control board and a power module.

In the case of downsizing the electromotive device (motor) described above, for example, it is conceivable that the control board and the power module (power board) are brought close to each other in the axial direction so as to reduce the axial dimension of the controller, thereby reducing the axial size of the entire electromotive device.

However, when the control board and the power module are brought close to each other, a noise generated from the power module tends to affect a position sensor (rotation sensor) mounted on the control board. Therefore, there is a problem that the detection accuracy of the position sensor deteriorates.

SUMMARY OF THE INVENTION

In view of the aforementioned problem, preferred embodiments of the present invention provide a motor having a structure capable of suppressing deterioration of detection accuracy of a rotation sensor in the case of downsizing the motor in an axial direction.

A motor according to one aspect of a preferred embodiment of the present invention includes: a motor main body including a rotor including a shaft centered on a center axis extending in an axial direction, and a stator surrounding the rotor; a power board including a switching element and electrically connected to the motor main body; a control board electrically connected to the power board and disposed on an axial counter output side of the motor main body; a control board holder attached to the motor main body to hold the control board; a sensor magnet positioned on a counter output side of the stator and fixed to the shaft; a rotation sensor attached to the control board to face the sensor magnet; and a power board case directly or indirectly attached to the motor main body to hold the power board, wherein the power board is positioned radially outward of the motor main body, and board surfaces of the power board are inclined with respect to board surfaces of the control board.

DETAILED DESCRIPTION OF THE PREFERRED EMBODIMENTS

Figure 1:
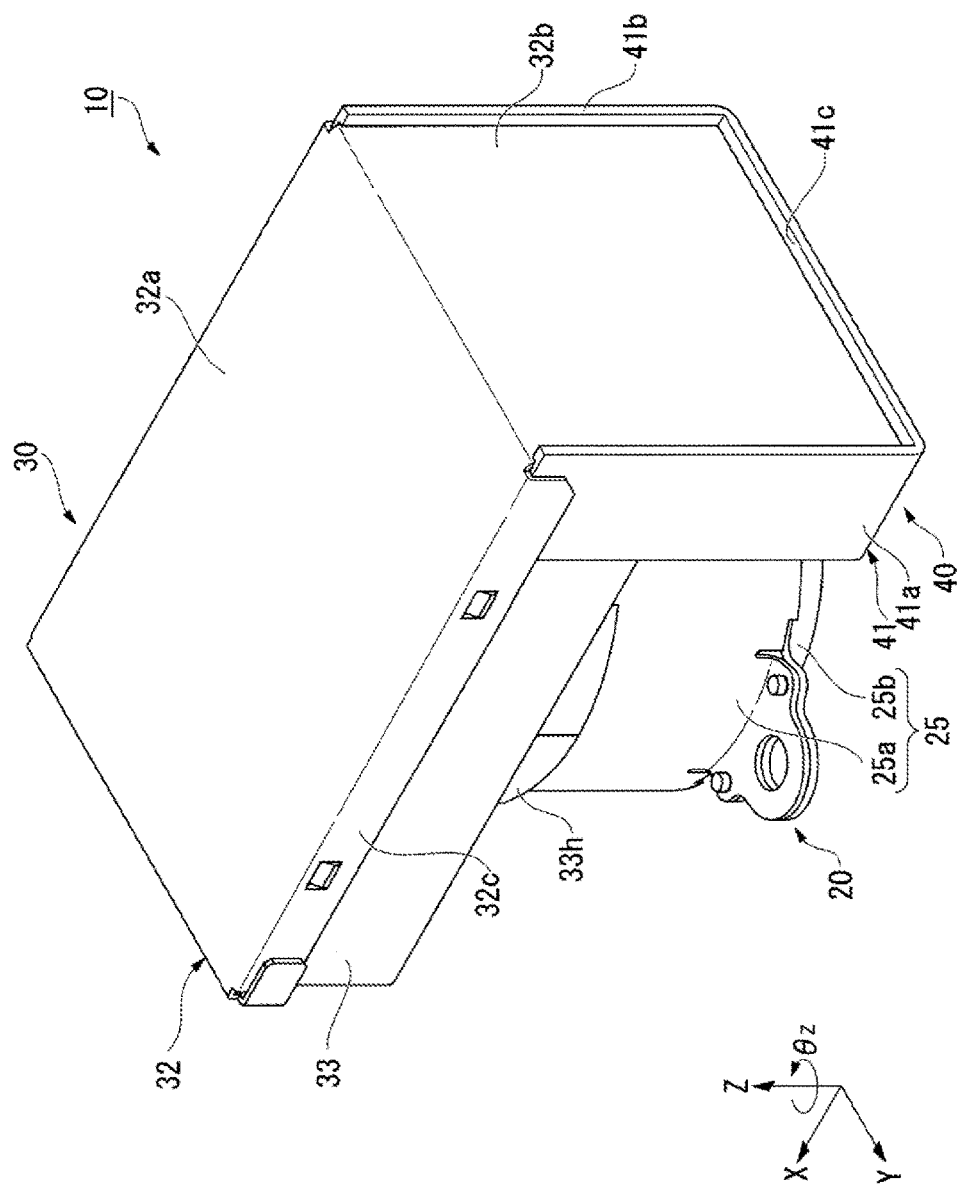
FIG. 1 is a perspective view showing a motor according to a first preferred embodiment of the present invention.

Hereinafter, motors according to preferred embodiments of the present invention will be described with reference to the drawings. The scope of the present invention is not limited to the following preferred embodiments and may be arbitrarily changed within the scope of the technical idea of the present invention. Furthermore, in the drawings described below, in order to make the respective configurations easy to understand, there are cases where the scales, numbers and the like in the respective structure are made different from those of the actual structures.

In the drawings, an XYZ coordinate system is appropriately shown as a three-dimensional orthogonal coordinate system. In the XYZ coordinate system, the Z axis direction is a direction parallel to the axial direction of the center axis J shown in FIG. 4. The X axis direction is a direction parallel to the length direction of a control board holding case 33 shown in FIG. 4, namely a left-right direction in FIG. 4. The Y axis direction is a direction parallel to the width direction of the control board holding case 33, namely a direction orthogonal to both the X axis direction and the Z axis direction.

In the following description, the side in the axial direction (Z axis direction) on which the power of a motor 10 is transmitted, namely the negative side (−Z side) in the Z axis direction will be referred to as "output side". The side in the axial direction opposite to the side from which the output of the motor 10 is taken out, namely the positive side (+Z side) in the Z axis direction will be referred to as "counter output side". The side from which the output of the motor 10 is taken out refers to the side on which the shaft 22 of the motor 10 is exposed to the outside of the motor 10.

Unless specifically mentioned otherwise, the direction parallel to the center axis J (Z axis direction) will be simply referred to as "axial direction", the radial direction around the center axis J will be simply referred to as "radial direction", and the circumferential direction around the center axis J, namely the direction extending around the central axis J (θZ direction) will be simply referred to as "circumferential direction".

First Preferred Embodiment

Figure 2:
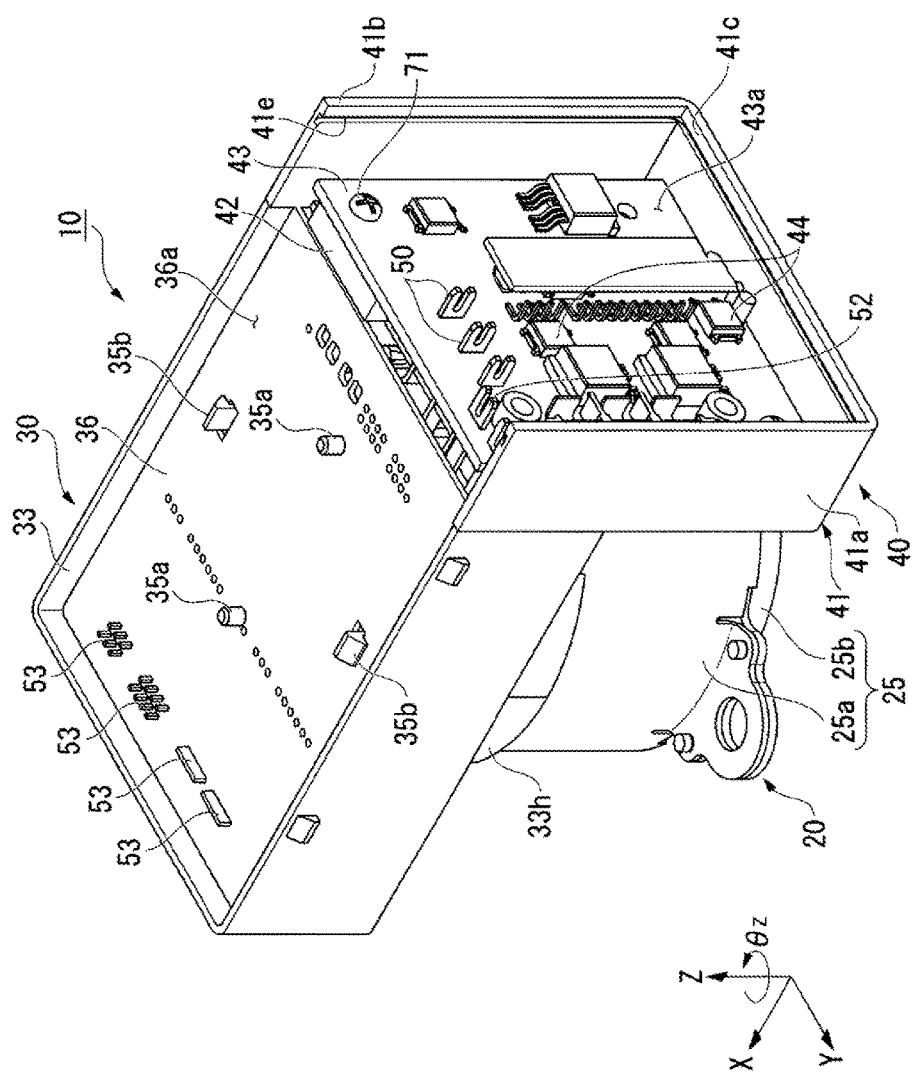
FIG. 2 is a perspective view showing the motor according to the first preferred embodiment of the present invention.
Figure 3:
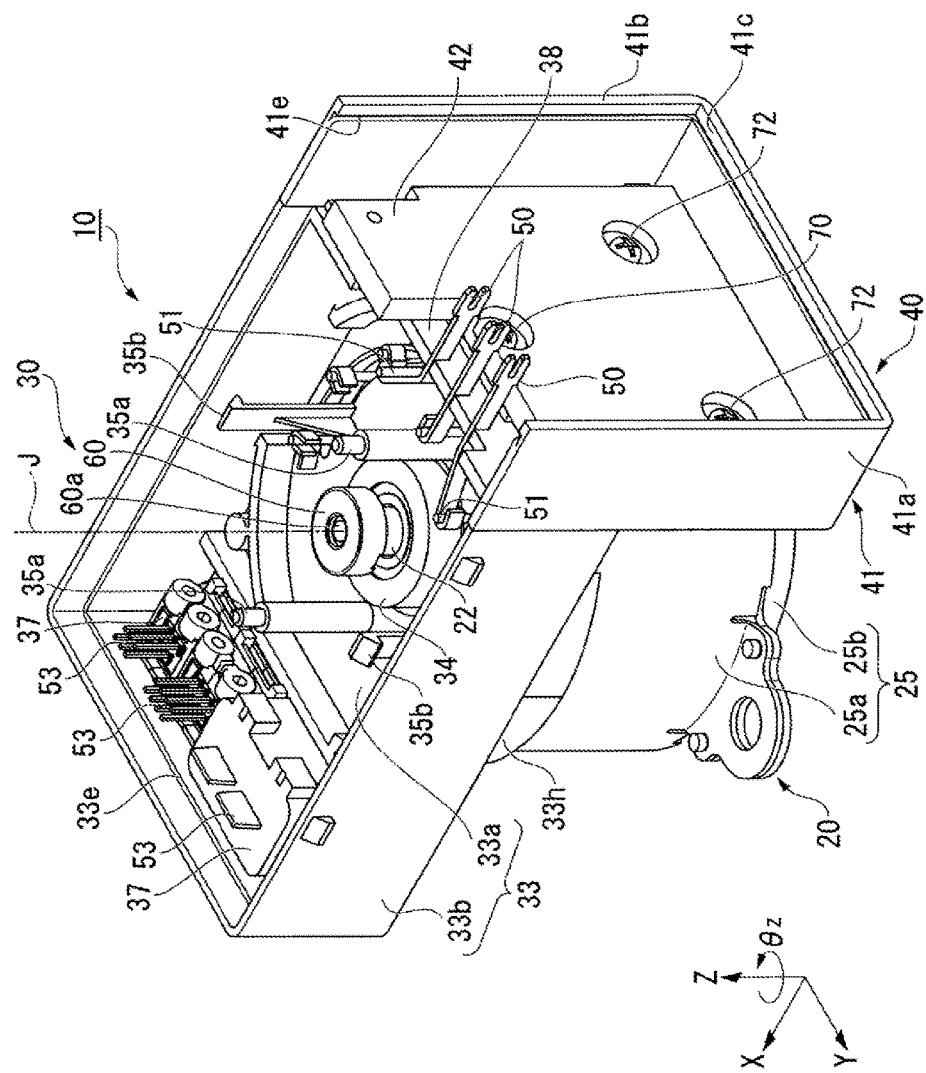
FIG. 3 is a perspective view showing the motor according to the first preferred embodiment of the present invention.
Figure 4:
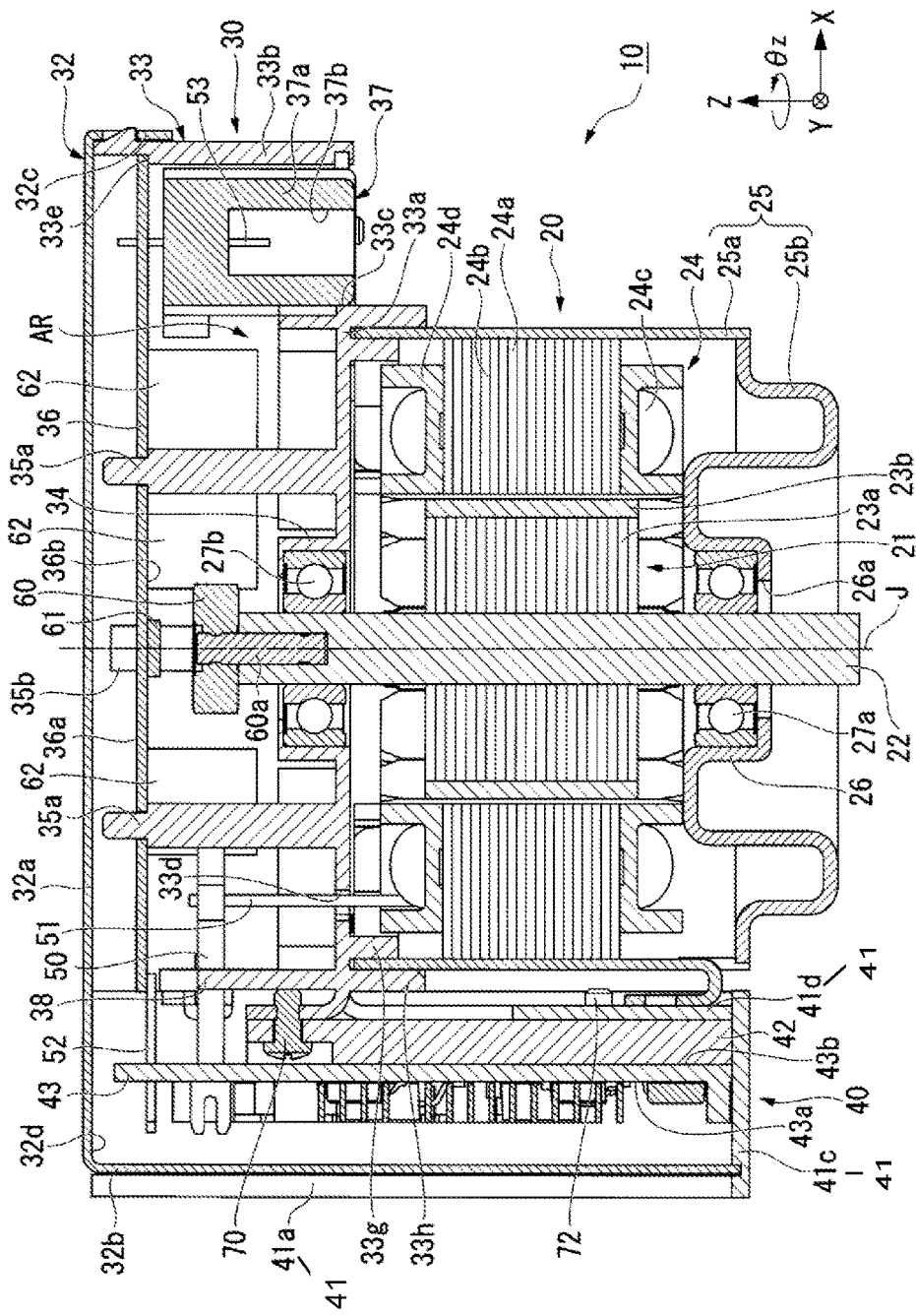
FIG. 4 is a sectional view showing the motor according to the first preferred embodiment of the present invention.

FIGS. 1 to 3 are perspective views showing a motor 10 according to the present preferred embodiment. FIG. 4 is a sectional view showing the motor 10 of the present preferred embodiment. In FIGS. 2 and 3, the illustration of a cover 32 is omitted. In FIG. 3, the illustration of a control board 36 and a power board 43 is omitted.

The motor 10 of the present preferred embodiment is a brushless motor. As shown in FIGS. 1 to 4, the motor 10 of the present preferred embodiment includes a motor main body 20, a control board 36, a sensor magnet 60, a rotation sensor 61, an electronic component 62, a power board 43, a control board holder 30, and a power board case 40.

As shown in FIG. 4, the control board 36 is disposed on the counter output side (+Z side) of the motor main body 20. The sensor magnet 60 is fixed to the shaft 22 of the motor main body 20. The rotation sensor 61 and the electronic component 62 are attached to the control board 36. The power board 43 is located radially outward of the motor main body 20. The control board holder 30 is attached to the motor main body 20 to hold the control board 36. The power board case 40 is attached to the motor main body 20 to hold the power board 43. The respective components will be described in detail below.

The motor main body 20 includes a rotor 21 including a shaft 22, an output side bearing 27a, a counter output side bearing (bearing) 27b, a stator 24, and a housing 25.

The rotor 21 includes a shaft 22, a rotor core 23a, and a rotor magnet 23b. The shaft 22 is centered on a center axis J extending in the axial direction (Z axis direction). The shaft 22 is supported by the output side bearing 27a and the counter output side bearing 27b so as to be rotatable around an axis (±θZ direction). An end portion on the output side (−Z side) of the shaft 22 is exposed to the outside of the motor 10 via an output shaft hole 26a provided in an output side lid portion 25b of the housing 25 to be described later.

The rotor core 23a surrounds the shaft 22 around the axis (θZ direction) and is fixed to the shaft 22. The rotor magnet 23b is fixed to the outer surface of the rotor core 23a extending around the axis. The rotor core 23a and the rotor magnet 23b rotate integrally with the shaft 22.

The stator 24 surrounds the rotor 21 around the axis (θZ direction), and rotates the rotor 21 around the center axis J. The stator 24 includes a core back portion 24a, tooth portions 24b, coils 24c, and insulators 24d.

The core back portion 24a has a cylindrical shape concentric with the shaft 22. The tooth portions 24b extend from the inner surface of the core back portion 24a toward the shaft 22. A plurality of tooth portions 24b is provided and is arranged at regular intervals in the circumferential direction of the inner surface of the core back portion 24a.

The coils 24c are formed by winding conductive wires. The coils 24c are provided in the respective tooth portions 24b via the insulators 24d. The insulators 24d are attached to the tooth portions 24b.

The housing 25 holds the stator 24 and the output side bearing 27a. The material of the housing 25 is, for example, a metal. The housing 25 includes a tubular portion 25a and an output side lid portion 25b.

The tubular portion 25a is a tubular member that holds the stator 24. In the present preferred embodiment, the tubular portion 25a has a cylindrical shape with both ends opened. An outer surface of the stator 24, namely an outer surface of the core back portion 24a is fitted to the inner surface of the tubular portion 25a. As a result, the stator 24 is held in the housing 25.

The output side lid portion 25b is fixed to the end portion on the output side (−Z side) of the tubular portion 25a. As shown in FIGS. 1 to 3, the tubular portion 25a and the output side lid portion 25b are fixed to each other via a flange portion. As shown in FIG. 4, the output side lid portion 25b covers the output side of the stator 24.

The output side lid portion 25b is provided with an output side bearing holding portion 26. The output side bearing holding portion 26 holds the output side bearing 27a on the radial inner side thereof. The output side bearing holding portion 26 is provided with an output shaft hole 26a concentric with the center axis J. A portion of the shaft 22 is inserted into the output shaft hole 26a. As described above, the end portion on the output side (−Z side) of the shaft 22 is exposed to the outside of the motor 10 via the output shaft hole 26a.

The output side bearing 27a is disposed on the output side (−Z side) of the stator 24. The output side bearing 27a is held by the output side bearing holding portion 26 of the output side lid portion 25b of the housing 25.

The counter output side bearing 27b is disposed on the counter output side (+Z side) opposite to the output side (−Z side) of the stator 24. The counter output side bearing 27b is held by a counter output side bearing holding portion (bearing holding portion) 34 of the control board holder 30 to be described later.

The output side bearing 27a and the counter output side bearing 27b support the shaft 22 of the rotor 21. The configuration of the output side bearing 27a and the counter output side bearing 27b is not particularly limited. Any well-known bearing may be used.

The control board 36 is arranged on the counter output side (+Z side) of the motor main body 20. The control board 36 is held by a control board holder 30. The board surfaces of the control board 36 are, for example, orthogonal to the axial direction (Z axis direction). The board surfaces of the control board 36 refer to a control board counter output side surface 36a existing on the counter output side and a control board output side surface 36b existing on the output side (−Z side).

A wiring member 52 that connects the control board 36 and the power board 43 is fixed to the control board output side surface 36b of the control board 36. The wiring member 52 extends from an end portion on the power board 43 side (−X side) of the control board output side surface 36b to the power board 43 side (−X side). As shown in FIG. 2, the wiring member 52 is inserted into a through-hole provided in the power board 43. As a result, the control board 36 is electrically connected to the power board 43. A printed wiring (not shown) is provided on at least one of the control board counter output side surface 36a and the control board output side surface 36b of the control board 36.

As shown in FIG. 3, the sensor magnet 60 is, for example, annular. In the sensor magnet 60, N poles and S poles are arranged alternately along the circumferential direction. As shown in FIG. 4, the sensor magnet 60 is located on the counter output side (+Z side) with respect to the stator 24. The sensor magnet 60 is located on the counter output side with respect to the counter output side bearing 27b.

The sensor magnet 60 is fixed to the shaft 22. More specifically, in the present preferred embodiment, the sensor magnet 60 is fitted to a support member 60a, which is fixed to the end portion on the counter output side (+Z side) of the shaft 22, from the radial outer side. The support member 60a is a member concentric with the shaft 22 extending in the axial direction (Z axis direction). In the present preferred embodiment, the sensor magnet 60 is located on the counter output side (+Z side) of the shaft 22.

The rotation sensor 61 is attached to the control board output side surface 36b of the control board 36. The rotation sensor 61 is, for example, a magneto-resistive element. The rotation sensor 61 faces the sensor magnet 60 in the axial direction (Z axis direction).

The electronic component 62 is attached to the control board output side surface 36b of the control board 36. The electronic component 62 extends from the control board output side surface 36b to the output side (−Z side). Among the elements attached to the control board 36, the electronic component 62 is an element having a relatively large dimension in the axial direction (Z axis direction). In the present preferred embodiment, a plurality of electronic components 62 is provided. At least a portion of the electronic component 62 is positioned radially outward of the sensor magnet 60.

An end portion on the output side (−Z side) of the electronic component 62 is positioned on the output side of the rotation sensor 61. In the present preferred embodiment, the entirety of the electronic component 62 is accommodated in an electronic component accommodating space AR provided inside a control board holding case 33 to be described later. The electronic component 62 is, for example, an electrolytic capacitor, a choke coil, or the like.

The power board 43 is located radially outward of the motor main body 20. The power board 43 is held by a power board case 40. The board surfaces of the power board 43 is inclined with respect to the board surfaces of the control board 36, namely the control board counter output side surface 36a and the control board output side surface 36b. The board surfaces of the power board 43 refer to a power board outer surface 43a existing on the outer side in the radial direction of the power board 43 and a power board inner surface 43b existing on the inner side in the radial direction of the power board 43. In the present preferred embodiment, the board surfaces of the power board 43 are, for example, orthogonal to the board surfaces of the control board 36. That is to say, the board surfaces of the power board 43 are orthogonal to the radial direction.

In the subject specification, the expression that the power board is located radially outward of the motor main body may mean that the radial position of the power board is located farther outward than the radial position of the motor main body, namely the radial position of the outer surface of the housing 25 in the present preferred embodiment. That is to say, in the subject specification, the expression that the power board is positioned radially outward of the motor main body also includes a configuration in which the power board does not overlap with the motor main body in the radial direction.

In the present preferred embodiment, the entire power board 43 radially overlaps with the control board holder 30. In the present preferred embodiment, a portion of the power board 43 radially overlaps with the control board holding case 33 of the control board holder 30 to be described later. In the present preferred embodiment, other portions of the power board 43 radially overlap with the motor main body 20. That is to say, in the present preferred embodiment, the power board 43 is provided across the radial outer side of the control board holding case 33 and the radial outer side of the motor main body 20.

The end portion on the counter output side (+Z side) of the power board 43 is located on the counter output side of the control board 36. The end portion on the output side (−Z side) of the power board 43 is located on the output side of the control board 36. A portion of the power board 43 radially overlaps with the control board 36.

As shown in FIG. 2, the power board 43 includes a switching element 44. The switching element 44 is attached to a power board outer surface 43a of the power board 43. The switching element 44 is, for example, a power transistor. In the present preferred embodiment, a plurality of switching elements 44 is provided. The switching elements 44 constitute an inverter circuit.

A bus bar 50 to be described later is connected to the power board 43. The power board 43 is electrically connected to the motor main body 20 via the bus bar 50.

As shown in FIG. 4, the control board holder 30 accommodates the control board 36 therein. The control board holder 30 includes a control board holding case 33, a cover 32, a counter output side bearing holding portion (bearing holding portion) 34, a bus bar 50, and a connector portion 37. That is to say, the motor 10 includes a bus bar 50. In the present preferred embodiment, for example, the control board holding case 33, the counter output side bearing holding portion 34 and the connector portion 37 are a single member. The single member including the control board holding case 33, the counter output side bearing holding portion 34 and the connector portion 37 is manufactured by, for example, injection molding.

The control board holding case 33 holds the control board 36. As shown in FIG. 3, the control board holding case 33 is, for example, a box opened toward the counter output side (+Z side). Inside the control board holding case 33, an electronic component accommodating space (electronic component accommodating portion) AR to accommodate the electronic component 62 is provided. That is to say, the control board holder 30 includes an electronic component accommodating space AR.

In the present preferred embodiment, the end portion on the counter output side (+Z side) of the shaft 22 protrudes into the electronic component accommodating space AR. In the electronic component accommodating space AR, the sensor magnet 60 is accommodated. That is to say, a portion of the electronic component accommodating space AR radially overlaps with the sensor magnet 60.

The shape of the control board holding case 33 in a plan view (in an XY plane view) is, for example, a rectangular shape. The control board holding case 33 is made of, for example, a resin. The control board holding case 33 includes a bottom portion 33a and a side wall portion 33b.

As shown in FIG. 4, the bottom portion 33a is attached to the end portion on the counter output side (+Z side) of the housing 25. That is to say, the bottom portion 33a is attached to the counter output side of the motor main body 20. Although not shown, the bottom portion 33a is, for example, screwed to a flange portion provided on the output side (+Z side) of the housing 25. Thus, the bottom portion 33a is fixed to the housing 25. By fixing the bottom portion 33a to the housing 25, the control board holding case 33, namely the control board holder 30 is fixed to the motor main body 20.

On the output side (−Z side) surface of the bottom portion 33a, an inner protruding portion 33g and an outer protruding portion 33h protruding toward the output side are provided. The inner protruding portion 33g extends along the circumferential direction. Although not shown, for example, there is provided a plurality of inner protruding portions 33g. The inner protruding portions 33g are arranged at regular intervals along the circumferential direction. The inner protruding portions 33g are fitted inside the housing 25.

The outer protruding portion 33h is located radially outward of the inner protruding portion 33g. The outer protruding portion 33h extends in the circumferential direction. Although not shown, as with the inner protruding portion 33g, for example, there is provided a plurality of outer protruding portions 33h. The outer protruding portions 33h are arranged at regular intervals along the circumferential direction. The housing 25 is fitted radially inside the outer protruding portion 33h.

That is to say, the end portion on the counter output side (+Z side) of the housing 25 is fitted between the inner protruding portion 33g and the outer protruding portion 33h in the radial direction. Thus, the housing 25 is positioned in the radial direction.

On the surface on the counter output side (+Z side) of the bottom portion 33a, there are provided a control board supporting portion 35a and a control board fixing portion 35b which protrude toward the counter output side. There are provided two control board supporting portions 35a and two control board fixing portions 35b.

The control board supporting portion 35a has a stepped shape in which the diameter of the end portion on the counter output side (+Z side) becomes small. As shown in FIG. 4, a tip portion of the control board supporting portion 35a having a smaller diameter passes through a through-hole provided in the control board 36. The control board output side surface 36b of the control board 36 is in contact with the stepped surface of the control board supporting portion 35a. Thus, the control board 36 is supported from the output side (−Z side) by the control board supporting portion 35a. Two control board supporting portions 35a are provided, for example, along the X axis direction. One of the control board supporting portions 35a is provided on the connector portion 37 side (+X side) of the center axis J. The other control board supporting portion 35a is provided on the power board 43 side (the −X side) of the center axis J.

As shown in FIG. 3, the control board fixing portion 35b is provided with claws in the end portion on the counter output side (+Z side). As shown in FIG. 2, the claws of the control board fixing portion 35b is in contact with the control board counter output side surface 36a of the control board 36. The control board fixing portion 35b is fixed to the control board 36 by snap-fitting. As shown in FIG. 3, two control board fixing portions 35b are provided, for example, along the Y axis direction. One of the control board fixing portions 35b is provided on one side (+Y side) of the center axis J. The other control board fixing portion 35b is provided on the other side (−Y side) of the center axis J.

In this manner, the control board 36 is held on the control board holding case 33 by the control board supporting portion 35a and the control board fixing portion 35b. That is to say, the control board 36 is held on the control board holder 30.

As shown in FIG. 4, through-holes 33c and 33d extending in the axial direction (Z axis direction) are provided in the bottom portion 33a. The through-hole 33c is provided at a position radially outward of the motor main body 20. The end portion on the output side (−Z side) of the connector portion 37 is inserted into the through-hole 33c.

The through-hole 33d is provided at a position overlapping with the motor main body 20 in the axial direction (Z axis direction). A coil wiring 51 connected to the bus bar 50 passes through the through-hole 33d.

As shown in FIG. 3, the side wall portion 33b is a frame-shaped portion extending from the bottom portion 33a to the counter output side (+Z side). The control board 36, the sensor magnet 60, the rotation sensor 61, the electronic component 62 and the connector portion 37 are accommodated inside the side wall portion 33b, namely in the electronic component accommodating space AR.

As shown in FIGS. 3 and 4, a stepped portion 33e is provided on the inner surface of the side wall portion 33b. The stepped portion 33e is a portion where the thickness of the side wall portion 33b, namely the dimension in the X axis direction or the dimension in the Y axis direction becomes thin toward the counter output side (+Z side). As shown in FIGS. 2 and 4, the outer edge portion of the control board 36 is supported by the stepped portion 33e from the output side (−Z side).

As shown in FIG. 3, a bus bar holder 38 is provided as a portion of the side wall portion 33b on the wall portion of the side wall portion 33b on the side of the power board case 40 (−X side). That is to say, the control board holder 30 includes a bus bar holder 38. In the present preferred embodiment, the bus bar holder 38 and the control board holding case 33 are, for example, a single member.

The bus bar holder 38 is a portion that holds the bus bar 50. In the present preferred embodiment, the bus bar holder 38 is a portion provided with a cutout into which the bus bar 50 is fitted at the end portion on the counter output side (+Z side) of the side wall portion 33b.

The cover 32 covers the counter output side of the control board holding case 33. The cover 32 is made of, for example, a resin. As shown in FIG. 1, the cover 32 includes a control board cover portion 32a, a depending portion 32c, and a power board cover portion 32b. In the present embodiment, the cover 32 is a single member.

As shown in FIG. 4, the control board cover portion 32a covers the counter output side (+Z side) of the control board 36. That is to say, the cover 32 covers the counter output side of the control board 36. The control board cover portion 32a is, for example, orthogonal to the axial direction (Z axis direction). The cover output side surface 32d on the output side (−Z side) of the control board cover portion 32a is in contact with the end portion on the counter output side of the power board case 40. As shown in FIG. 1, the shape of the control board cover portion 32a in a plan view (in an XY plane view) is, for example, a rectangular shape.

The depending portion 32c is a portion extending to the output side (−Z side) from three sides out of four sides defining the outer edge portion of the control board cover portion 32a except the side existing on the side of the power board case 40 (−X side). The depending portion 32c covers the end portion on the counter output side (+Z side) of the control board holding case 33 from the outside. The depending portion 32c is fixed to the control board holding case 33 by, for example, snap-fitting. Thus, the cover 32 and the control board holding case 33 are fixed.

The power board cover portion 32b extends to the output side (−Z side) from the side existing on the power board case 40 side (−X side) out of four sides defining the outer edge portion of the control board cover portion 32a. That is to say, the control board cover portion 32a and the power board cover portion 32b preferably define an L-shaped structure. The end portion on the output side of the power board cover portion 32b is in contact with a bottom plate portion 41c of a power board case 40 to be described later. As shown in FIG. 4, the power board cover portion 32b covers the power board outer surface 43a side (−X side) of the power board 43.

The counter output side bearing holding portion 34 protrudes to the counter output side from the surface on the counter output side (+Z side) of the bottom portion 33a of the control board holding case 33. As shown in FIG. 3, the counter output side bearing holding portion 34 has a cylindrical shape. As shown in FIG. 4, a counter output side bearing 27b is fitted to the radial inner side of the counter output side bearing holding portion 34. As a result, the counter output side bearing holding portion 34 holds the counter output side bearing 27b. The counter output side bearing holding portion 34 is located on the output side (−Z side) of the control board 36. In the present preferred embodiment, the counter output side bearing holding portion 34 is, for example, a single member integral with the control board holding case 33.

The bus bar 50 electrically connects the power board 43 and the motor main body 20. As shown in FIG. 3, for example, three bus bars 50 are provided in this preferred embodiment. The bus bar 50 is fitted into a cutout of a bus bar holder 38 provided in the control board holding case 33. Thus, the bus bar 50 is held by the bus bar holder 38.

The bus bar 50 extends from the inside of the control board holding case 33 to the outside of the control board holding case 33. The end portion of the bus bar 50 on the inside of the control board holding case 33 is connected to the coil wiring 51. In the present preferred embodiment, for example, the bus bar 50 grips the end portion on the counter output side (+Z side) of the coil wiring 51.

As shown in FIG. 4, the coil wiring 51 is a wiring extending from the coil 24c of the stator 24 to the inside of the control board holding case 33 via a through-hole 33d of the bottom portion 33a of the control board holding case 33. The coil wiring 51 is, for example, an end portion of the conductive wire of the coil 24c. In the present preferred embodiment, the end portion on the counter output side (+Z side) of the coil wiring 51 is located on the output side (−Z side) of the rotation sensor 61. The coil wiring 51 may be a separate member from the conductive wire of the coil 24c.

As shown in FIGS. 2 and 4, the end portion of the bus bar 50 on the outside of the control board holding case 33 passes through a through-hole provided in the power board 43. Thus, the stator 24 of the motor main body 20 and the power board 43 are electrically connected via the bus bar 50 and the coil wiring 51.

As shown in FIG. 4, in the present preferred embodiment, the entire bus bar 50 is located on the output side (+Z side) of the rotation sensor 61 attached to the control board 36. That is to say, the position where the bus bar 50 and the power board 43 are connected is on the output side of the rotation sensor 61.

In the present preferred embodiment, the bus bar 50 is positioned between the end portion on the counter output side (+Z side) of the sensor magnet 60 and the end portion on the output side (−Z side) of the stator 24 in the axial direction (Z axis direction). More specifically, in the present preferred embodiment, the bus bar 50 is provided at a position radially overlapping with the sensor magnet 60.

The connector portion 37 is disposed at the end portion on the side (+X side) opposite to the power board case 40 inside the control board holding case 33. That is to say, the connector portion 37 is positioned on the opposite side of the power board 43 with respect to the center axis J. The connector portion 37 includes a connector portion main body 37a and a connector wiring 53.

In this specification, the expression that the connector portion is positioned on the opposite side of the power board with respect to the central axis includes a configuration in which a straight line passing through the center axis and the power board and a straight line passing through the center axis J and the connector portion define an angle of 90° or more in a plan view (XY plane view). That is to say, the expression that the connector portion is positioned on the opposite side of the power board with respect to the central axis also includes, for example, a configuration in which the connector portion 37 is positioned on the ±Y sides of the center axis J.

An imaginary line which is orthogonal to a line connecting the center axis J and the power board 43 in a plan view (XY plane view) and which passes through the center axis J is defined. In the subject specification, the expression that the connector portion 37 is positioned on the opposite side of the power board 43 with respect to the center axis J includes a configuration in which at least a portion of the connector portion is positioned in a region opposite to the region where the power board 43 is provided, out of two regions partitioned by the imaginary line.

The end portion on the output side (−Z side) of the connector portion main body 37a is inserted into the through-hole 33c of the bottom portion 33a. On the end surface existing on the output side of the connector portion main body 37a, a connector opening portion 37b opened toward the output side (−Z side) is provided. The connector opening portion 37b is opened toward the outside of the motor 10. In the present preferred embodiment, the connector portion main body 37a is, for example, a single member integral with the control board holding case 33.

The connector wiring 53 is held by the connector portion main body 37a. A portion of the connector wiring 53 is buried in the connector portion main body 37a. The end portion on the output side (−Z side) of the connector wiring 53 protrudes from the inner surface of the connector opening portion 37b to the inside of the connector opening portion 37b. That is to say, the output side end portion of the connector wiring 53 is exposed to the outside of the motor 10.

The end portion on the counter output side (+Z side) of the connector wiring 53 protrudes from the connector portion main body 37a toward the counter output side. The end portion on the counter output side of the connector wiring 53 is connected to the control board 36.

The connector portion 37 is connected to an external power source (not shown). The external power source is electrically connected to the connector wiring 53 exposed inside the connector opening portion 37b. As a result, electric power is supplied from the external power source to the control board 36 via the connector wiring 53.

In the present preferred embodiment, the power board case 40 is attached to the control board holder 30. That is to say, the power board case 40 is directly attached to the motor main body 20 via the control board holder 30. The power board case 40 extends in the axial direction (Z axis direction).

As shown in FIG. 3, the power board case 40 includes a power board case main body 41 and a board supporting plate 42. The power board case main body 41 includes a bottom plate portion 41c, side plate portions 41a and 41b, and a back plate portion 41d.

The bottom plate portion 41c is a portion located in the end portion on the output side (−Z side) of the power board case 40. In the present preferred embodiment, the bottom plate portion 41c extends in the Y-axis direction. In the present preferred embodiment, the bottom plate portion 41c is positioned on the counter output side (+Z side) with respect to the output side end portion of the motor main body 20, namely the output side end portion of the shaft 22.

The side plate portion 41a extends to the counter output side (+Z side) from the end portion on one side (+Y side) of the bottom plate portion 41c. The side plate portion 41b extends to the counter output side from the end portion on the other side (−Y side) of the bottom plate portion 41c.

As shown in FIG. 4, the end portion on the counter output side (+Z side) of the side plate portion 41a is in contact with the cover output side surface 32d of the control board cover portion 32a. This configuration also applies to the side plate portion 41b. As a result, the counter output side end portion of the power board case 40 comes into contact with the output side (−Z side) surface of the cover 32.

The back plate portion 41d extends to the counter output side from the surface on the counter output side (+Z side) of the bottom plate portion 41c. Although not shown, both end portions in the Y-axis direction of the back plate portion 41d are connected to the side plate portions 41a and 41b, respectively.

As shown in FIG. 2, a groove 41e is provided inside the power board case main body 41. The groove 41e is provided radially outward of the power board 43. The groove 41e is provided over the entirety of the side plate portion 41b in the axial direction (Z axis direction), the entirety of the bottom plate portion 41c in the Y axis direction, and the entirety of the side plate portion 41a in the axial direction (not shown). As shown in FIG. 1, the outer edge portion of the power board cover portion 32b of the cover 32 is fitted into the groove 41e.

As shown in FIGS. 3 and 4, the board supporting plate 42 is provided inside the power board case main body 41. The board supporting plate 42 is in contact with the side plate portion 41a, the side plate portion 41b, the bottom plate portion 41c and the back plate portion 41d. The board supporting plate 42 is fixed, for example, by the back plate portion 41d and two bolts 72. The board supporting plate 42 is fixed, for example, by a control board holding case 33 and bolts 70.

As shown in FIG. 2, the power board 43 is fixed to the board supporting plate 42. The power board 43 is fixed to the board supporting plate 42, for example, by bolts 71. As shown in FIG. 4, the power board inner surface 43b of the power board 43 is in contact with the radial outer surface of the board supporting plate 42.

In the motor 10 of the present preferred embodiment, an external power source is connected to the connector portion 37, such that a drive current is supplied to the control board 36. The drive current is supplied from the control board 36 to the stator 24 via the power board 43. When the drive current flows through the coil 24c of the stator 24, a magnetic field is generated. Thus, the rotor 21 having the shaft 22 rotates. In this way, the motor 10 obtains rotational power.

The rotation sensor 61 detects the change of the magnetic field caused by the sensor magnet 60, thus detecting the rotation information of the rotor 21. The inverter circuit including the switching elements 44 provided on the power board 43 switches and controls the forward and reverse flow directions of the drive current supplied to the stator 24, based on the rotation information of the rotor 21 detected by the rotation sensor 61.

According to the present preferred embodiment, the power board 43 is located radially outward of the motor main body 20. The board surfaces of the power board 43 are inclined with respect to the board surfaces of the control board 36. Therefore, in the case of downsizing the motor 10 in the axial direction, by disposing the power board 43 on the radial outer side of the motor main body 20 or the radial outer side of the control board holding case 33, it is possible to dispose the power board 43 and the control board 36 in a somewhat spaced-apart relationship while downsizing the motor 10 in the axial direction. Thus, it is possible to suppress the noise, which is generated from the power board 43, from affecting the rotation sensor 61 mounted on the control board 36. Therefore, according to the present preferred embodiment, it is possible to obtain a motor having a structure capable of suppressing deterioration of the detection accuracy of the rotation sensor 61 in the case of downsizing the motor 10 in the axial direction.

As described above, according to the present preferred embodiment, it is possible to downsize the motor 10 in the axial direction while suppressing deterioration of the detection accuracy of the rotation sensor 61. By reducing the size of the motor 10, it is possible to increase the ratio of the axial dimension of the motor main body 20 to the axial dimension of the motor 10. As a result, it is possible to obtain a motor which is small in size and capable of outputting a high torque.

Furthermore, according to the present preferred embodiment, the power board 43 radially overlaps with the control board holder 30. Therefore, for example, when the rotation sensor 61, the sensor magnet 60 and the counter output side bearing 27b are held in the control board holder 30 as in the present preferred embodiment, it is easy to dispose the power board 43 on the radial outer side of the rotation sensor 61, the sensor magnet 60 and the counter output side bearing 27b. Thus, it is possible to easily connect the power board 43 and the coil 24c of the stator 24 while suppressing the increase in the axial dimension of the motor 10.

In addition, a relatively large current may flow through the bus bar 50 and the coil wiring 51 which connect the power board 43 and the stator 24. Therefore, the magnetic field generated by the current flowing through the bus bar 50 and the coil wiring 51 tends to affect the rotation sensor 61. As a result, the detection accuracy of the rotation sensor 61 may decrease in some cases.

On the other hand, according to the present preferred embodiment, it is easy to dispose the power board 43 on the radial outer side of the rotation sensor 61, the sensor magnet 60 and the counter output side bearing 27b. Therefore, it is easy to reduce the length of the bus bar 50 and the length of the coil wiring 51. As a result, it is possible to shorten the current flow path through which the current flows between the power board 43 and the stator 24. Therefore, according to the present preferred embodiment, it is possible to reduce the influence on the rotation sensor 61 of the magnetic field generated by the current flowing between the power board 43 and the stator 24. As a result, it is possible to suppress the reduction in the detection accuracy of the rotation sensor 61.

Furthermore, according to the present preferred embodiment, the power board 43 radially overlaps with the control board holder 30 that holds the control board 36. Therefore, it is easy to reduce the length of the wiring member 52 that connects the power board 43 and the control board 36.

Furthermore, according to the present preferred embodiment, the control board holder 30 includes the control board holding case 33. The power board 43 radially overlaps with the control board holding case 33. Therefore, it is easier to arrange the power board 43 on the radial outer side of the rotation sensor 61, the sensor magnet 60 and the counter output side bearing 27b. This makes it easier to connect the power board 43 and the coil 24c of the stator 24 while suppressing the increase in the axial dimension of the motor 10. Moreover, it is possible to further reduce the length of the bus bar 50, the length of the coil wiring 51 and the length of the wiring member 52.

Furthermore, according to the present preferred embodiment, the power board 43 radially overlaps with the control board 36. Therefore, it is possible to shorten the distance between the power board 43 and the control board 36. Thus, it is possible to further reduce the length of the wiring member 52 which connects the power board 43 and the control board 36. It is easy to electrically connect the power board 43 and the control board 36.

Furthermore, according to the present preferred embodiment, the board surfaces of the control board 36 are orthogonal to the axial direction. This makes it possible to reduce the axial dimension of the motor 10.

Furthermore, according to the present preferred embodiment, the board surfaces of the power board 43 are orthogonal to the radial direction. This makes it possible to reduce the radial dimension of the motor 10.

Furthermore, according to the present preferred embodiment, the end portion on the counter output side of the power board case 40 is in contact with the output side surface of the cover 32 which covers the counter output side of the control board holding case 33. Thus, it is easy to arrange the power board 43 held by the power board case 40 and the control board 36 held by the control board holding case 33 so as to overlap in the radial direction. Therefore, as described above, it is possible to reduce the length of the wiring member 52 which connects the power board 43 and the control board 36. It is easy to electrically connect the power board 43 and the control board 36.

Furthermore, for example, when the bus bar 50 or the coil wiring 51 passes through the same axial position as the axial position of the rotation sensor 61, the magnetic field acting around the axis (θZ direction), which is generated by a relatively large current flowing through the bus bar 50 and the coil wiring 51, may easily affect the rotation sensor 61. As a result, the detection accuracy of the rotation sensor 61 may decrease in some cases.

On the other hand, according to the present preferred embodiment, the output side end portion of the power board 43 is located on the output side of the control board 36. Therefore, the bus bar 50 and the coil wiring 51 can be disposed closer to the output side than the rotation sensor 61, and the power board 43 and the stator 24 can be connected to each other. Thus, it is possible to suppress the influence on the rotation sensor 61 of the magnetic field generated by the current flowing through the bus bar 50 and the coil wiring 51. Therefore, according to the present preferred embodiment, it is possible to suppress the decrease in the detection accuracy of the rotation sensor 61.

Furthermore, according to the present preferred embodiment, the control board holder 30 includes the bus bar 50. Therefore, the members connected to the power board 43, namely the control board 36 and the bus bar 50 can be held by the control board holder 30. By combining the respective wiring members as one unit, it is easy to downsize the entire motor 10. In addition, it is possible to simplify the wiring work on the power board 43.

Further, according to the present preferred embodiment, the position where the bus bar 50 and the power board 43 are connected is on the output side of the rotation sensor 61. Therefore, the entire bus bar 50 and the entire coil wiring 51 can be disposed on the output side of the rotation sensor 61. That is to say, it is possible to arrange the members, through which a relatively large current flows, on the output side of the rotation sensor 61 in a concentrated manner. This makes it possible to further suppress deterioration of the detection accuracy of the rotation sensor 61.

Furthermore, for example, if the motor 10 is downsized in the axial direction, the axial distance between the rotation sensor 61 and the stator 24 becomes smaller. Therefore, the rotation sensor 61 is more likely to be affected by the magnetic field of a relatively large current flowing between the stator 24 and the power board 43. Even in such a case, according to the present preferred embodiment, the path of the current flowing between the stator 24 and the power board 43, namely the bus bar 50 and the coil wiring 51 can be easily disposed at a position sufficiently separated from the rotation sensor 61 in the axial direction. Therefore, it is possible to suppress the decrease in the detection accuracy of the rotation sensor 61.

Furthermore, according to the present preferred embodiment, the sensor magnet 60 is positioned on the counter output side of the counter output side bearing 27b. Therefore, the sensor magnet 60 can be arranged close to the rotation sensor 61. Thus, according to the present preferred embodiment, the detection accuracy of the rotation sensor 61 can be improved.

In the case of adopting a configuration in which the sensor magnet 60 is located on the counter output side of the counter output side bearing 27b, it is impossible to reduce the axial distance between the sensor magnet 60, the counter output side bearing 27b and the stator 24 to some extent or more. That is to say, there is a limit in downsizing the motor 10 in the axial direction by reducing the axial distance between the sensor magnet 60, the counter output side bearing 27b and the stator 24. Therefore, by effectively utilizing the space existing on the radial outer side of the sensor magnet 60 and the counter output side bearing 27b, it is possible to dispose the members without increasing the axial dimension of the motor 10.

On the other hand, according to the present preferred embodiment, the bus bar 50 is located axially between the counter output side end portion of the sensor magnet 60 and the counter output side end of the stator 24. Therefore, it is possible to electrically connect the stator 24 and the power board 43 without increasing the axial dimension of the motor 10.

Furthermore, according to the present preferred embodiment, the control board holder 30 includes the bus bar holder 38. Therefore, the bus bar 50 can be held by the bus bar holder 38. As a result, it is possible to facilitate the positioning of the bus bar 50. In addition, by using an insulating material as the material of the bus bar holder 38, it is easy to arrange the bus bar 50 in an insulated manner.

Furthermore, according to the present preferred embodiment, the bus bar holder 38 and the control board holding case 33 are a single member. Therefore, there is no need to provide the bus bar holder 38 as a separate member. This makes it possible to reduce the number of parts of the motor 10. Thus, the number of assembly steps for manufacturing the motor 10 can be reduced, and the productivity can be improved. Moreover, for example, when manufacturing the control board holding case 33 by injection molding or the like, the bus bar holder 38 can be manufactured at the same time. Therefore, it is possible to suppress the increase in the manufacturing cost of the motor 10.

For example, in the case where the end portion on the output side of the electronic component 62 is positioned on the output side of the rotation sensor 61 as in the present preferred embodiment, there is a possibility that the axial dimension of the motor 10 is increased by the axial size of the electronic component 62.

On the other hand, according to the present preferred embodiment, at least a portion of the electronic component 62 attached to the control board 36 is positioned radially outward of the sensor magnet 60. Therefore, the motor 10 can be downsized in the axial direction.

Furthermore, according to the present preferred embodiment, the control board holder 30 includes the electronic component accommodating space AR. Thus, the sensor magnet 60 and the electronic component 62 can be arranged to overlap in the radial direction inside the electronic component accommodating space AR, namely inside the control board holding case 33. Therefore, according to the present preferred embodiment, the motor 10 can be downsized in the axial direction.

Furthermore, according to the present preferred embodiment, the connector portion 37 is located on the opposite side of the power board 43 with respect to the center axis J. Therefore, when the external power source is connected to the connector portion 37, it is possible to prevent the external power source from coming into contact with the power board 43 and the power board case 40. Thus, according to the present preferred embodiment, it is easy to connect the external power source to the connector portion 37.

Furthermore, according to the present preferred embodiment, the cover 32 includes the control board cover portion 32a and the power board cover portion 32b. The cover 32 is a single member. Therefore, it is not necessary to separately provide covers for covering the control board 36 and the power board 43, respectively. Thus, according to the present preferred embodiment, the number of parts of the motor 10 can be reduced.

In the present preferred embodiment, the following configuration may be adopted.

In the above description, the board surfaces of the power board 43 are inclined vertically with respect to the board surfaces of the control board 36. However, the present invention is not limited thereto. In the present preferred embodiment, the inclination of the board surfaces of the power board 43 is not particularly limited as long as the board surfaces of the power board 43 are inclined with respect to the board surfaces of the control board 36. In the present preferred embodiment, the inclination of the board surfaces of the control board 36 is not particularly limited. The board surfaces of the control board 36 may not be orthogonal to the axial direction.

In the above description, the power board case 40 is attached to the motor main body 20 via the control board holding case 33. However, the present invention is not limited thereto. In the present preferred embodiment, the power board case 40 may be directly attached to the motor main body 20. That is to say, in the present preferred embodiment, it is possible to employ a configuration in which the power board case 40 is directly or indirectly attached to the motor main body 20.

Furthermore, in the present preferred embodiment, it is possible to adopt a configuration in which at least a portion of the power board 43 radially overlaps with the control board holder 30. That is to say, in the above description, the entire power board 43 radially overlaps with the control board holder 30. However, the present invention is not limited thereto. In the present preferred embodiment, only a part of the power board 43 may radially overlap with the control board holder 30.

Furthermore, in the present preferred embodiment, it is possible to adopt a configuration in which at least a portion of the power board 43 radially overlaps with the control board holding case 33. That is to say, in the present preferred embodiment, the entire power board 43 may radially overlap with the control board holding case 33.

Furthermore, in the present preferred embodiment, it is possible to employ a configuration in which at least a portion of the power board 43 radially overlaps with the control board 36. That is to say, in the present preferred embodiment, the entire power board 43 may overlap with the control board 36.

Furthermore, in the present preferred embodiment, the bus bar holder 38 may be provided as a separate member from the control board holding case 33. In this case, it is possible to adopt a configuration in which the bus bar holder 38 is located radially inward of the control board holding case 33. According to this configuration, for example, the motor 10 can be downsized in the axial direction, as compared with a configuration in which the bus bar holder 38 and the control board holding case 33 are arranged side by side in the axial direction. Moreover, in the present preferred embodiment, the bus bar holder 38 may not be provided.

Furthermore, in the present preferred embodiment, the configuration of the rotation sensor 61 is not particularly limited. In the present preferred embodiment, the rotation sensor 61 may be, for example, a resolver or a Hall element.

Furthermore, in the present preferred embodiment, the control board holding case 33, the counter output side bearing holding portion 34 and the connector portion 37 may be separate members.

Furthermore, in the present preferred embodiment, the bus bar 50 may not be provided in the control board holder 30. For example, in the present preferred embodiment, the bus bar 50 may be provided in the motor main body 20. In this case, for example, the bus bar 50 connects the coil wiring, which extends from the stator 24 to the output side, and the power board 43. Moreover, in the present embodiment, the bus bar 50 may not be provided in the motor 10.

Furthermore, in the present preferred embodiment, at least a portion of the bus bar 50 may radially overlap with the counter output side bearing 27b.

Furthermore, in the present preferred embodiment, it is possible to adopt a configuration in which at least a portion of the electronic component 62 is accommodated in the electronic component accommodating space AR. That is to say, in the present preferred embodiment, only a portion of the electronic component 62 may be accommodated in the electronic component accommodating space AR.

In the subject specification, the expression that a portion of the electronic component 62 is accommodated in the electronic component accommodating space AR include a configuration in which a portion of one electronic component 62 is accommodated in the electronic component accommodating space AR and a configuration in which the entirety of some of a plurality of electronic components 62 is accommodated in the electronic component accommodating space AR.

Furthermore, in the present preferred embodiment, one inner protruding portion 33g and one outer protruding portion 33h may be provided in the bottom portion 33a. In this case, for example, the inner protruding portion 33g and the outer protruding portion 33h may be annular.

Second Preferred Embodiment

The second preferred embodiment differs from the first embodiment in that the connector portion and the power board are directly connected. The same components as those of the first preferred embodiment may be appropriately denoted by like reference numerals, and the description thereof may be omitted in some cases.

Figure 5:
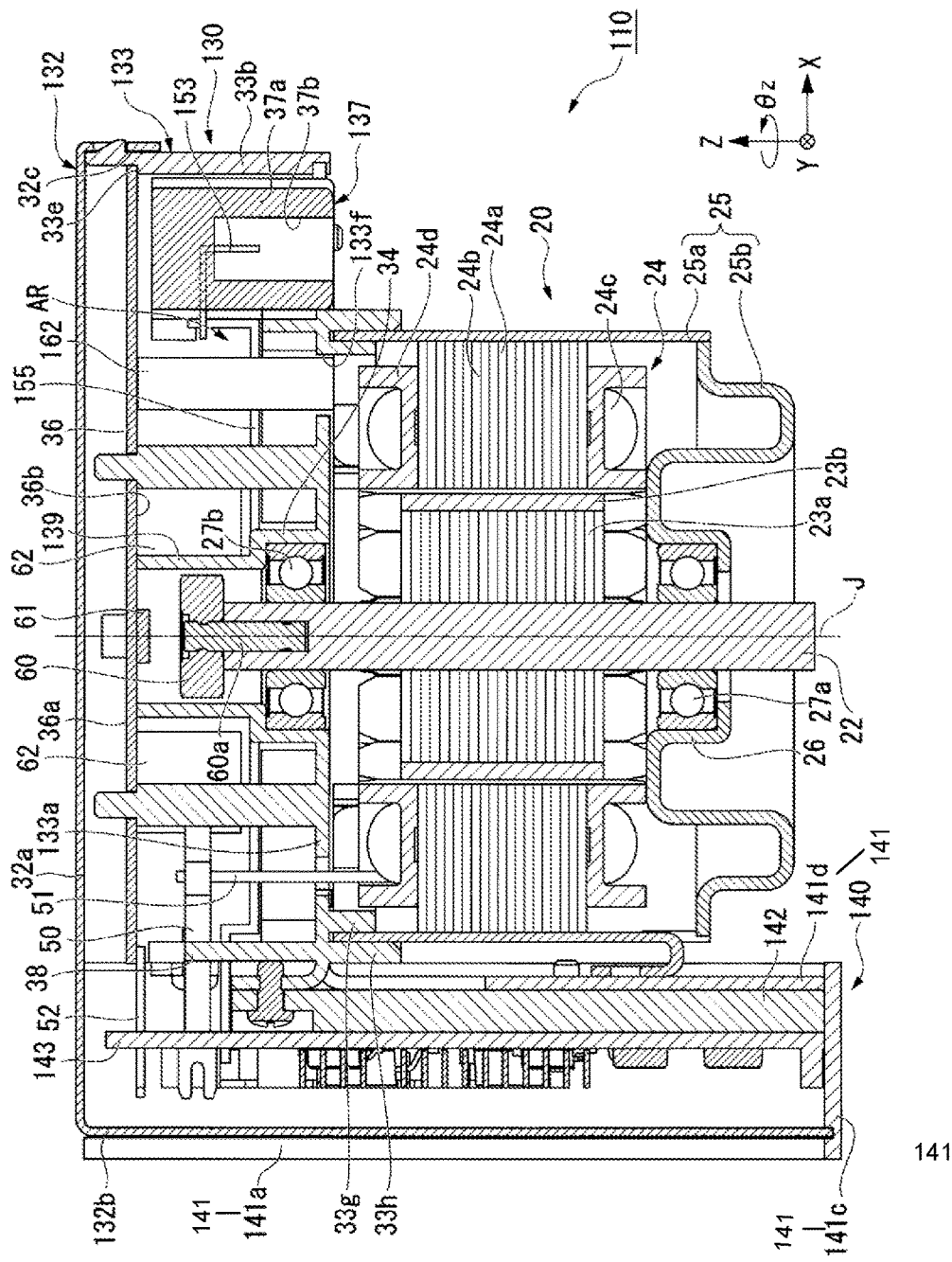
FIG. 5 is a sectional view showing a motor according to a second preferred embodiment of the present invention.

FIG. 5 is a sectional view showing a motor 110 of the present preferred embodiment. As shown in FIG. 5, the motor 110 of the present preferred embodiment includes a motor main body 20, a control board 36, a sensor magnet 60, a rotation sensor 61, an electronic component 62, an electronic component 162, a power board 143, a control board holder 130, and a power board case 140.

The dimension of the electronic component 162 in the axial direction (Z axis direction) is larger than that of the electronic component 62. The end portion on the output side (−Z side) of the electronic component 162 is accommodated in an electronic component insertion portion 133f to be described later. The electronic component 162 may be an element different from or identical with the electronic component 62. Other configurations of the electronic component 162 are the same as those of the electronic component 62.

The power board 143 differs from the power board 43 of the first preferred embodiment in that its dimension in the axial direction (Z axis direction) is large. On the power board 143, for example, a larger number of switching elements than those of the power board 43 of the first preferred embodiment are mounted. The end portion on the output side (−Z side) of the power board 143 is located on the output side of the motor main body 20. Other configurations of the power board 143 are the same as those of the power board 43 of the first preferred embodiment.

The control board holder 130 includes a control board holding case 133, a cover 132, a counter output side bearing holding portion 34, a sensor magnet accommodating portion 139, a bus bar 50, a conducting member 155, and a connector portion 137.

The control board holding case 133 includes a bottom portion 133a and a side wall portion 33b. That is to say, the control board holder 130 includes a bottom portion 133a and a side wall portion 33b.

An electronic component insertion portion 133f is provided on the surface on the counter output side (+Z side) of the bottom portion 133a. In the present preferred embodiment, the electronic component insertion portion 133f is, for example, a through-hole portion penetrating the bottom portion 133a in the axial direction (Z axis direction). The end portion on the output side (−Z side) of the electronic component 162 is accommodated inside the electronic component insertion portion 133f.

Other configurations of the bottom portion 133a are the same as those of the bottom portion 33a of the first preferred embodiment. Other configurations of the control board holding case 133 are the same as those of the control board holding case 33 of the first preferred embodiment.

The cover 132 includes a control board cover portion 32a, a depending portion 32c, and a power board cover portion 132b. The power board cover portion 132b is the same as the power board cover portion 32b of the first preferred embodiment except that the size thereof in the axial direction is large. Other configurations of the cover 132 are the same as those of the cover 32 of the first preferred embodiment.

The sensor magnet accommodating portion 139 extends from the end portion on the counter output side (+Z side) of the counter output side bearing holding portion 34 to the counter output side. The end portion on the counter output side of the sensor magnet accommodating portion 139 is in contact with, for example, the control board output side surface 36b of the control board 36. The sensor magnet accommodating portion 139 is tubular. The sensor magnet accommodating portion 139 surrounds the sensor magnet 60 and the rotation sensor 61 in the circumferential direction. The sensor magnet accommodating portion 139 is, for example, a single member integral with the counter output side bearing holding portion 34.

The conducting member 155 is a member that electrically connects the connector portion 137 and the power board 143. The conducting member 155 is provided across the inside of the control board holding case 133 and the inside of the power board case 140. The conducting member 155 is positioned on the output side (−Z side) of the rotation sensor 61. The shape of the conducting member 155 is not particularly limited.

The connector portion 137 includes a connector portion main body 37a and a connector wiring 153. The end portion of the connector wiring 153 protruding into the control board holding case 133 is connected to the conducting member 155. As a result, the connector portion 137 and the power board 143 are directly electrically connected.

In the subject specification, the expression "directly electrically connected" also includes a configuration in which objects to be connected are connected via a member having only a function of conducting electricity. For example, in the present preferred embodiment, the expression that the connector portion 137 and the power board 143 are directly electrically connected includes a configuration in which the connector portion 137 and the power board 143 are electrically connected without interposing the control board 36 therebetween.

Other configurations of the connector portion 137 are the same as those of the connector portion 37 of the first preferred embodiment. Although not shown, in the present preferred embodiment, in addition to the connector portion 137 directly electrically connected to the power board 43, there is also provided the connector portion directly electrically connected to the control board 36 as in the first preferred embodiment.

Other configurations of the control board holder 130 are the same as those of the control board holder 30 of the first preferred embodiment.

The power board case 140 differs from the power board case 40 of the first preferred embodiment in that the dimension in the axial direction (Z axis direction) is large. The power board case 140 includes a power board case main body 141 and a board supporting plate 142. The power board case body 141 includes a bottom plate portion 141c, side plate portions 141a and 141b, and a back plate portion 141d.

The bottom plate portion 141c is located on the output side (−Z side) of the motor body 20. As a result, the output side end portion of the power board case 140 is located on the output side of the motor main body 20. The other configurations of the bottom plate portion 141c are the same as those of the bottom plate portion 41c of the first preferred embodiment.

The side plate portions 141a and 141b, the back plate portion 141d and the board supporting plate 142 are the same as the side plate portions 41a and 41b, the back plate portion 41d and the board supporting plate 42 of the first preferred embodiment except that the dimension in the axial direction (Z axis direction) is large.

Other configurations of the motor 110 are the same as those of the motor 10 of the first preferred embodiment.

According to the present preferred embodiment, the connector portion 137 and the power board 143 are directly electrically connected to each other. Therefore, a drive current can be directly supplied from the external power source connected to the connector portion 137 to the power board 143 without passing through the control board 36. This makes it easy to supply electric power to the power board 143. Even when the drive current supplied to the power board 143 is increased, the drive current supplied to the power board 143 hardly affects the electronic components 62 and 162 and the rotation sensor 61 provided on the control board 36.

Furthermore, according to the present preferred embodiment, the connector portion 137 and the power board 143 are electrically connected by the conducting member 155. Therefore, even when the distance between the connector portion 137 and the power board 143 is large, it is possible to electrically connect the connector portion 137 and the power board 143 in a stable manner.

Furthermore, according to the present preferred embodiment, the conducting member 155 is located on the output side of the rotation sensor 61. Therefore, it is possible to suppress the influence on the rotation sensor 61 of the magnetic field generated by the drive current flowing through the conducting member 155. In addition, since the conducting member 155 can be disposed inside the control board holding case 33, namely in the electronic component accommodating space AR, it is possible to suppress the increase in the axial dimension of the motor 110.

Furthermore, according to the present preferred embodiment, the control board holder 130 includes the sensor magnet accommodating portion 139 surrounding the sensor magnet 60 and the rotation sensor 61 in the circumferential direction. Therefore, it is possible to suppress the influence on the rotation sensor 61 of the noise generated from the electronic components 62 and 162 and the power board 143.

Furthermore, according to the present preferred embodiment, the output side end portion of the power board case 140 is located on the output side of the motor main body 20. Therefore, it is possible to increase the area of the board surfaces of the power board 143 held by the power board case 140. Thus, a plurality of switching elements can be mounted on the power board 143.

Furthermore, according to the present preferred embodiment, the bottom portion 133a is provided with the electronic component insertion portion 133f. Therefore, the output side end portion of the electronic component 162 attached to the control board output side surface 36b of the control board 36 is accommodated in the electronic component insertion portion 133f, such that the control board 36 can be arranged closer to the bottom portion 133a. Thus, according to the present preferred embodiment, it is possible to reduce the axial dimension of the motor 110.

In the present preferred embodiment, it may be possible to adopt the following configuration.

In the present preferred embodiment, the sensor magnet accommodating portion 139 may be a separate member from the counter output side bearing holding portion 34.

Further, in the present preferred embodiment, the sensor magnet accommodating portion 139 may be provided at any location of the control board holder 130. In the present preferred embodiment, for example, the sensor magnet accommodating portion 139 may protrude from the bottom portion 133a toward the counter output side.

In the above description, the electronic component insertion portion 133f is a through-hole portion. However, the present invention is not limited thereto. The electronic component insertion portion 133f may be a recess portion provided on the counter output side surface of the bottom portion 133a.

Furthermore, in the present preferred embodiment, it is possible to employ a configuration in which at least a portion of the electronic component 162 is accommodated in the electronic component insertion portion 133f. That is to say, in the present preferred embodiment, the entire electronic component 162 may be accommodated in the electronic component insertion portion 133f.

The applications of the motors described in the first and second preferred embodiments are not particularly limited. As an example, the motors described in the first and second preferred embodiments are preferably used for a column type EPS (Electric Power Steering) system or the like.

The configurations described in the first and second preferred embodiments may be appropriately combined unless a conflict arises.

What is claimed is:

1. A motor, comprising:
   a motor main body including a rotor including a shaft centered on a center axis extending in an axial direction, and a stator surrounding the rotor;
   a power board including a switching element and electrically connected to the motor main body;
   a control board electrically connected to the power board and disposed on an axial counter output side of the motor main body;
   a control board holder attached to the motor main body to hold the control board;
   a sensor magnet positioned on a counter output side of the stator and fixed to the shaft;
   a rotation sensor attached to the control board to face the sensor magnet; and
   a power board case directly or indirectly attached to the motor main body to hold the power board, wherein
   the power board is positioned radially outward of the motor main body, and
   board surfaces of the power board are inclined with respect to board surfaces of the control board.

2. The motor according to claim 1, wherein at least a portion of the power board radially overlaps with the control board holder.

3. The motor according to claim 2, wherein the control board holder includes a control board holding case that holds the control board, and
   at least a portion of the power board radially overlaps with the control board holding case.

4. The motor according to claim 3, wherein at least a portion of the power board axially overlaps with the control board.

5. The motor according to claim 4, wherein
   the board surfaces of the control board are orthogonal to the axial direction, and
   the board surfaces of the power board are orthogonal to a radial direction.

6. The motor according to claim 1, wherein
   the control board holder includes a cover that covers a counter output side of the control board,
   the power board case extends in the axial direction, and
   a counter output side end portion of the power board case makes contact with an axial output side surface of the cover.

7. The motor according to claim 1, further comprising:
   a bus bar that electrically connects the power board and the motor main body, wherein
   an axial output side end portion of the power board is located on an output side of the control board.

8. The motor according to claim 7, wherein the control board holder includes the bus bar.

9. The motor of claim 7, wherein a position where the bus bar and the power board are connected is on an output side of the rotation sensor.

10. The motor according to claim 1, wherein
    the control board holder includes a connector portion to be connected to an external power source, and
    the connector portion and the power board are directly electrically connected to each other.

11. The motor according to claim 10, wherein
    the control board holder includes a conducting member that electrically connects the connector portion and the power board, and
    the conducting member is positioned on an axial output side of the rotation sensor.

12. The motor according to claim 1, wherein the control board holder includes a sensor magnet accommodating portion that surrounds the rotation sensor and the sensor magnet in a circumferential direction.

13. The motor according to claim 1, wherein
    the motor main body includes a bearing that supports the shaft, the control board holder includes a bearing holding portion that holds the bearing, and
the bearing holding portion is positioned on an axial output side of the control board.

14. The motor according to claim 1, wherein
the motor main body includes a bearing that supports the shaft, and
the sensor magnet is positioned on the counter output side of the bearing.

15. The motor according to claim 1, wherein the control board holding unit includes:
a bus bar that electrically connects the power board and the motor main body;
a control board holding case that holds the control board; and
a bus bar holder that holds the bus bar.

16. The motor according to claim 15, wherein the bus bar holder is positioned radially inward of the control board holding case.

17. The motor according to claim 15, wherein the bus bar holder and the control board holding case are defined by a single monolithic member.

18. The motor according to claim 1, further comprising:
an electronic component attached to an axial output side surface of the control board, wherein at least a portion of the electronic component is positioned radially outward of the sensor magnet.

19. The motor according to claim 18, wherein
the control board holder includes an electronic component accommodating portion in which at least a portion of the electronic component is accommodated, and
at least a portion of the electronic component accommodating portion radially overlaps with the sensor magnet.

20. The motor according to claim 1, wherein
the control board holder includes a connector portion to be connected to an external power source, and
the connector portion is positioned on the opposite side of the power board with respect to the center axis.

21. The motor according to claim 1, wherein an axial output side end portion of the power board case is positioned on the output side of the motor main body.

* * * * *